United States Patent [19]
Rivers

[11] 3,921,432
[45] Nov. 25, 1975

[54] METHOD OF FORMING A TAPERED PLEATED FILTER PLEAT FOLD SEPARATOR AND A SEPARATOR FORMED THEREBY

[75] Inventor: Richard D. Rivers, Louisville, Ky.

[73] Assignee: American Air Filter Company, Inc., Louisville, Ky.

[22] Filed: Mar. 24, 1975

[21] Appl. No.: 561,107

[52] U.S. Cl. .................. 72/362; 72/196; 72/167; 72/168
[51] Int. Cl.² ................................ B21D 13/00
[58] Field of Search ............ 72/167, 136, 377, 362, 72/168, 196

[56] References Cited
UNITED STATES PATENTS

| 319,442 | 6/1888 | Bellamy | 72/167 |
| 2,001,553 | 5/1938 | Spencer | 72/196 X |
| 3,470,053 | 9/1969 | Rule | 72/362 X |
| 3,541,829 | 11/1970 | Engleman | 72/196 |

Primary Examiner—Milton S. Mehr
Attorney, Agent, or Firm—Jon C. Winger

[57] ABSTRACT

A method of forming a tapered pleated filter pleat fold separator particularly well suited for use in a pleated filter element to hold the flanks of the filter pleats apart a predetermined distance, comprises a first step of forming a generally rectangular separator blank having a wedge-shaped cross-section in a plane transverse to one axis of the rectangular blank from a maleable material, compressing the rectangular blank in a plane normal to the plane containing the wedge-shaped cross-section to form said rectangular blank into an arcuately-shaped blank, and subsequently forming tapered pleats in the once arcuately-shaped blank to produce a generally rectangular tapered pleated filter pleat fold separator.

10 Claims, 9 Drawing Figures

METHOD OF FORMING A TAPERED PLEATED FILTER PLEAT FOLD SEPARATOR AND A SEPARATOR FORMED THEREBY

BACKGROUND OF THE INVENTION

The present invention relates to methods of fabricating separator members and more particularly to a method of fabricating tapered pleated filter pleat fold separators for use with pleated filter elements.

Tapered pleated filter pleat fold separators for pleated filter elements are known; however, the heretofore known methods employed to fabricate them have resulted in wasting material and are, therefore, costly.

Generally, a heretofore well known method of fabrication has been to cut or punch an arcuately-shaped separator blank from a rectangular blank of uniform thickness and subsequently form a plurality of tapered pleats in the arcuate blank. The punching of the arcuate blank from the rectangular blank results in the substantial amount of offal.

SUMMARY OF THE INVENTION

The present invention recognizes the drawbacks of prior known methods and provides a method for fabricating a tapered pleated filter pleat fold separator adapted for use in a pleated filter element, which method essentially eliminates offal is straightforward, efficient in production and is economical. More particularly, the present invention provides a method of fabricating a tapered pleated filter pleat fold separator adapted for use in pleated filter elements, the method comprising the steps of forming a generally rectangular maleable separator blank having a generally wedge-shaped cross-section in a plane transverse to one axis of the blank; compressing the rectangular blank in a plane normal to a plane containing the wedge-shaped cross-section to form the rectangular blank into a generally arcuate-shaped blank, and pleating the arcuately-shaped blank to form the tapered pleated filter pleat fold separator.

DESCRIPTION OF THE DRAWINGS

A better understanding of the present invention can be had with reference to the accompanying drawings in which like numerals refer to like parts throughout the several views and wherein:

FIG. 4 is a diagrammatical representation of a prior art method of fabricating an arcuate blank from which to form a tapered pleated filter pleat fold separator;

DESCRIPTION OF THE PREFERRED EMBODIMENT

Figure 1:
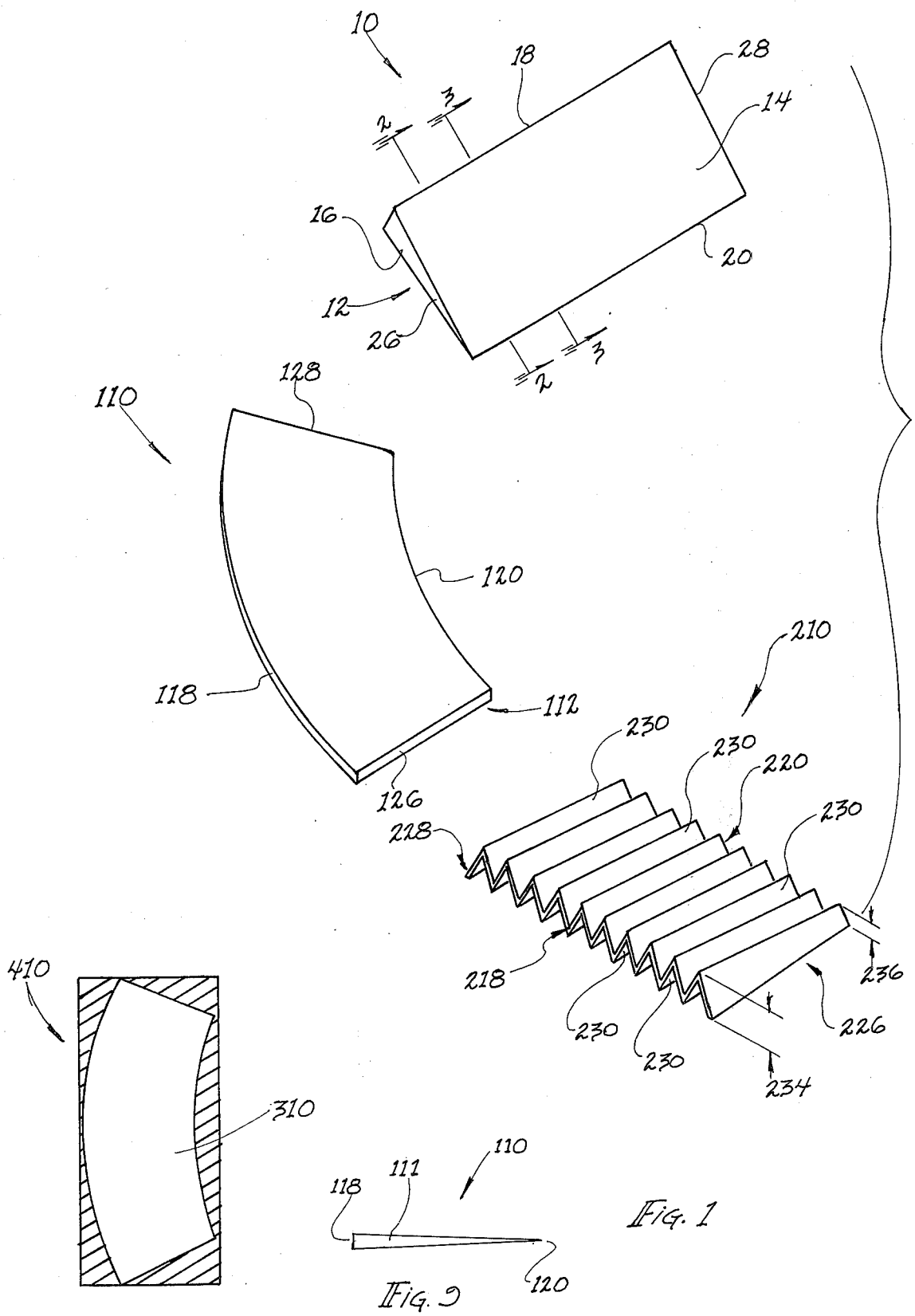
FIG. 1 is a diagrammatical representation of the results of the various steps of the present invention.
Figure 2:
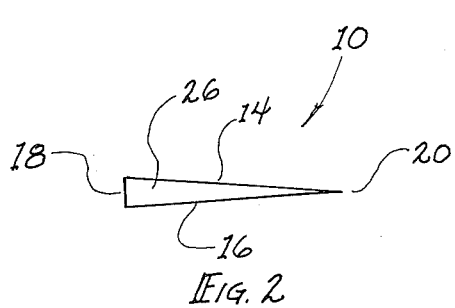
FIG. 2 is a cross-sectional view of one construction of a rectangular separator blank as viewed in the direction of arrows 2—2 in FIG. 1 according to the present invention.
Figure 3:
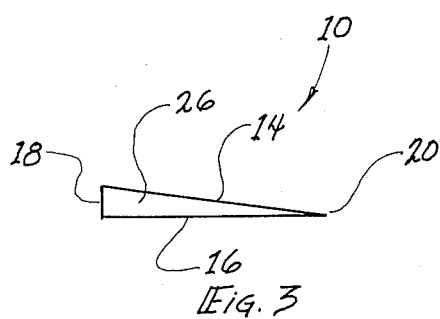
FIG. 3 is a cross-sectional view of another construction of a rectangular separator blank as viewed in the direction of arrows 3—3 in FIG. 1 according to the present invention.
Figure 5:
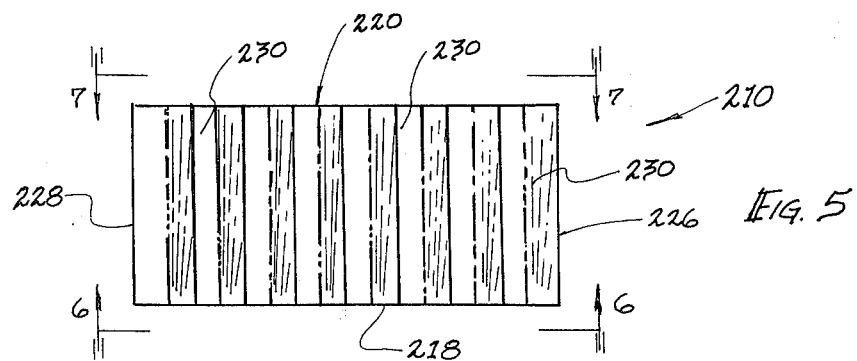
FIG. 5 is a top view of the pleated tapered filter pleat fold separator fabricated by the method of the present invention.
Figure 6:
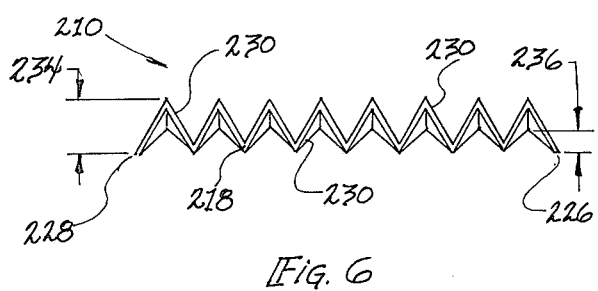
FIG. 6 is a back view of the pleated tapered filter pleat fold separator viewed in the direction of arrows 6—6 in FIG. 5.
Figure 7:
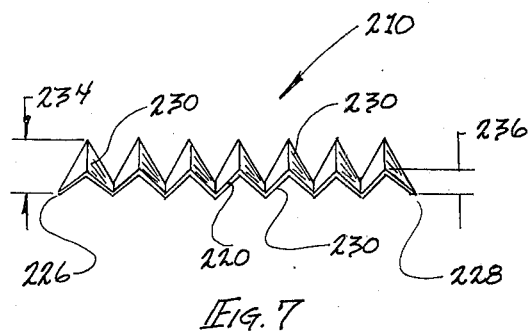
FIG. 7 is a front view of the pleated tapered filter pleat fold separator viewed in the direction of arrows 7—7 in FIG. 5.

Referring to FIG. 1, there is illustrated in diagrammatic fashion the results of the various steps of the present invention. The first step if forming from malleable material, a generally rectangular separator blank 10 having a generally wedge-shaped cross section 12 transverse to one axis of the rectangular blank, which axis is disclosed herein as the longitudinal axis of blank 10, longitudinal sides 18 and 20 and transverse ends 26 and 28. The wedge-shaped transverse cross-section may be, for example, an isosceles triangle (see FIG. 2), i.e., both major surfaces 14 and 16 of the blank 10 are tapered from one side 18 of the blank 10 to the other side 20 of the blank 10; or a right triangle (see FIG. 3), i.e., only one major surface 14 of the blank is tapered from one side 18 to the other side 20. This forming step can be accomplished by a number of well known manufacturing processes such as extruding, hot or cold forging, casting and the like.

Next, the rectangular separator blank 10 with wedge-shaped transverse cross-section 12 is deformed by compressing the wedge-shaped cross-section 12 to form an arcuately-shaped separator blank, generally denoted as the numeral 110, from the rectangular blank 10. The rectangular blank 10 can be selectively compressed to form an arcuately-shaped blank having a wedge-shaped cross-section 111 (see FIG. 9) having a smaller acute angle than the wedge-shaped cross-section 12 of the rectangular blank 10, or it can be compressed to a cross-section of uniform thickness as denoted by the numeral 112 in FIG. 1. The once straight edges 18 and 20 of the once rectangular blank 10 are now the major and minor arcuate edges 118 and 120, respectively, and the transverse ends 26 and 28 of the rectangular blank 10 are now the transverse ends 126 and 128 of the now arcuate blank 110. During the compressing step, the material forming the progressively thicker portions of the wedge-shaped transverse cross-section of the rectangular blank 10 is laterally displaced, thus, resulting in the arcuate blank 110. Again, any of the well known manufacturing processes may be used to compress the blank 10, such as roll forming, coining, hot or cold forging and the like.

Following the compressing step, the major and minor arcuate edges 118 and 120, and the ends 126 and 128 of the arcuate blank 110 may have to be trimmed to obtain clean smooth edges. However, this trimming may not be required in all instances as the compressing step may produce adequately clean and smooth arcuate edges 118 and 120 and ends 126, 128. If the compressing step itself does not produce arcuate edges 118, 120 and ends 126, 128 sufficiently clean and smooth, they can be trimmed by any convenient conventional means such as sawing, die trimming, trimming with a sharpened trimming wheel and the like.

With reference to FIGS. 1, 5, 6 and 7, the final step is forming a plurality of tapered pleats 230 in the arcuate blank 110, thus, producing a generally rectangular tapered pleated filter pleat fold separator 210 having sides 218, 220 and transverse ends 226, 228 which are mutually perpendicular to the sides 218, 220. Preferably, the pleats 230 taper from a maximum height, generally denoted as the numeral 234 along the side 218, to a minimum height, generally denoted as the numeral 236 along the side 220. The height of each pleat 230 uniformly increases from the side 220 to the side 218, the increasing width of the once arcuate blank 110 from the minor arcuate edge 220 to the major arcuate edge 218 having been utilized to form the increasing height of the pleats 230. Thus, the pleating is accomplished without substantially stretching the arcuate blank 110.

The pleating step can be performed by any convenient, conventional manufacturing means, for example, a metal break, forming die, forming rolls and the like.

The material used for carrying out the method of the present invention must be malleable. Examples of some exemplary metals which may be used are aluminum, stainless steel, copper or precious metals such as fold, silver and platinum. Other materials such as plastics, clays and fired or non-fired ceramics could also be used. The choice of material will, of course, be dictated somewhat by the specific application of a filter having the tapered pleated filter pleat fold separators.

With reference to FIG. 4, there is shown a step in a heretofore known means of forming an arcuate separator blank 310 used for manufacturing a tapered pleated filter pleat fold separator. The heretofore known means comprises cutting the arcuate blank 310 from a generally rectangular blank 410 by means of, for example, a blanking die. This method results in a substantial amount of unsalvagable offal, denoted by the cross hatch lines, which offal increases the cost of manufacturing the tapered pleated filter pleat fold separator.

Figure 8:
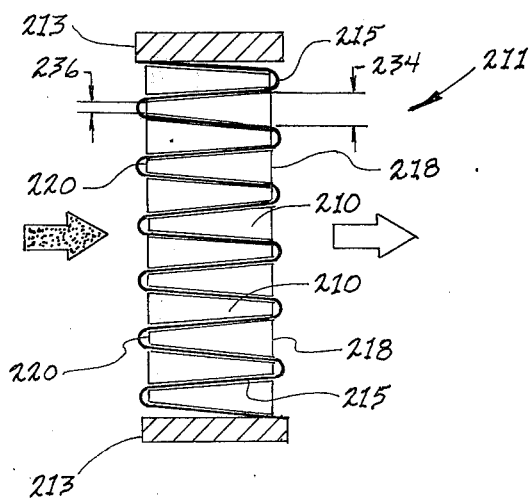
FIG. 8 is a cross-sectional view of a pleated filter having tapered pleated filter fold separators disposed therein holding the flanks of the pleat folds the filter media apart; and, FIG. 9 is a cross-sectional view of one construction of an arcuately-shaped blank according to the present invention.

Referring now to FIG. 8, there is shown in cross-section, a filter device, generally denoted by the numeral 211, having a flow-through housing 213 and a pleated filter media 215 disposed therein to filter a fluid, such as a gas, as it passes therethrough as indicated by the flow arrows. The mottled flow arrow denotes a dirty gas to be filtered, and the plain arrow indicates the clean gas filtered by the filter media 215. A plurality of tapered pleated filter pleat fold separators 210 are disposed between the flanks of the pleats of the filter element 215 to maintain a desired predetermined distance between the flanks of the filter element and prevent the filter element 215 from collapsing. The pleats 230 provide a path for the fluid to be cleaned as it passes through the pleated filter element 215.

The foregoing detailed description is given primarily for clearness of understanding and no unnecessary limitations should be understood therefrom for modifications will become obvious to those skilled in the art upon reading this disclosure and may be made without departing from the spirit of the invention or the scope of the appended claims.

What is claimed is:

1. A method of fabricating a tapered pleated filter pleat fold separator for use in pleated filter elements, said method comprising the steps of:
   forming a generally rectangular separator blank having a generally wedge-shaped cross-section transverse to one axis of the said rectangular separator blank from a malleable material;
   compressing said rectangular blank in a plane normal to the plane containing said wedge-shaped cross-section to form an arcuate shaped blank such that one of the edges of said rectangular separator blank comprises the major arc and the opposite edge comprises the minor arc of said arcuately-shaped blank; and,
   pleating said arcuately-shaped blank to form said tapered pleated filter pleat fold separator.

2. The method as defined in claim 1, wherein said compressing step further comprises compressing said rectangular blank to a cross-section of uniform thickness.

3. The method as defined in claim 1, wherein said compressing step further comprises compressing said rectangular blank to a wedge-shaped cross-section having a smaller acute angle than the acute angle of said wedge-shaped cross-section of said rectangular separator blank.

4. The method as defined in claim 1, further comprising the step of trimming at least one of the edges of said arcuate blank to obtain smooth, clean edges.

5. The method of claim 1, wherein the step of forming a rectangular separator blank comprises extruding said rectangular separator blank.

6. The method of claim 1, wherein the step of forming a rectangular separator blank comprises forging said rectangular separator blank.

7. The method of claim 1, wherein the step of forming a rectangular separator blank comprises casting said rectangular separator blank.

8. The method of claim 1, wherein the step of compressing said rectangular separator blank comprises forging said rectangular separator blank.

9. The method of claim 1, wherein the step of compressing said rectangular separator blank comprises rolling said rectangular blank.

10. The method of claim 1, wherein the step of pleating said arcuately-shaped blank comprises roll forming the pleats therein.

* * * * *